Oct. 18, 1932.  W. O. ROY  1,883,409
MEANS FOR DISTRIBUTING MOISTURE ABSORBING MATERIAL
Filed March 14, 1931
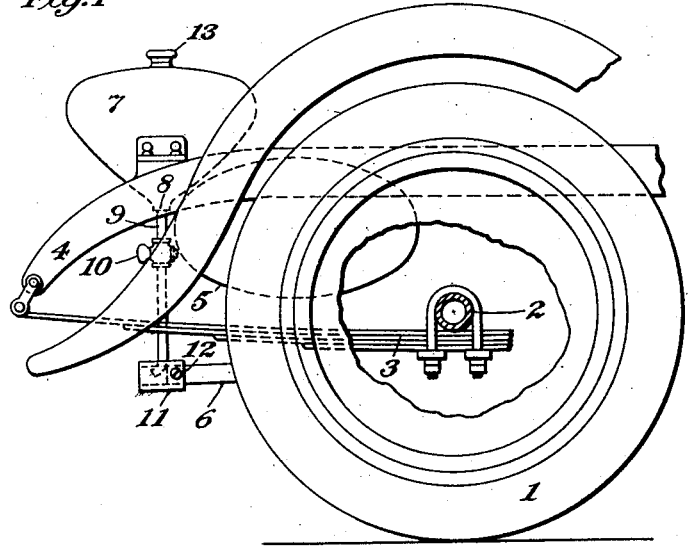
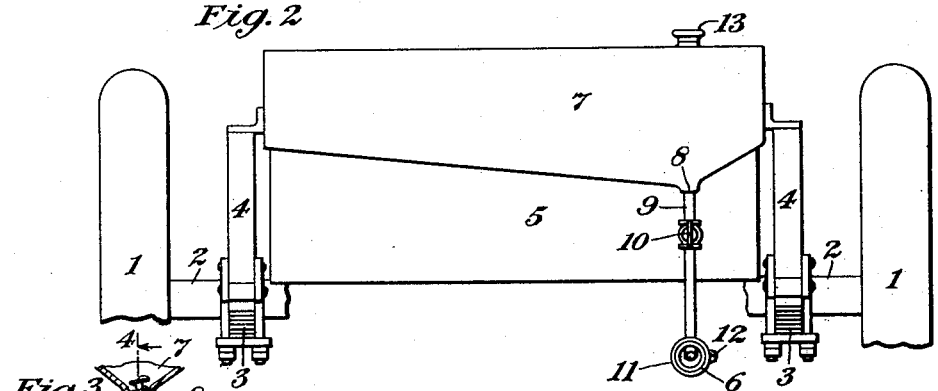
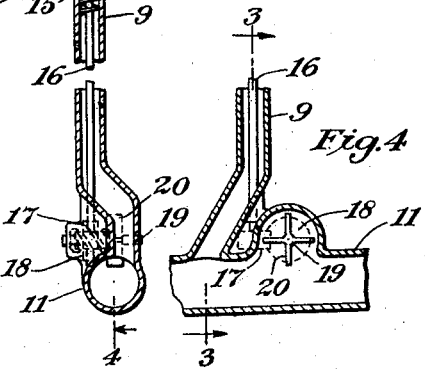
INVENTOR,
William Ormiston Roy.
BY HIS ATTORNEY Patented Oct. 18, 1932

1,883,409

UNITED STATES PATENT OFFICE

WILLIAM ORMISTON ROY, OF MONTREAL, QUEBEC, CANADA

MEANS FOR DISTRIBUTING MOISTURE ABSORBING MATERIAL

Application filed March 14, 1931. Serial No. 522,724.

My invention relates to a novel method for distributing moisture absorbing material on road surfaces and the like, and to novel means for carrying out such method, for the purpose of laying dust, softening ice, and the like.

Objects of my invention are to distribute such moisture absorbing material from vehicles in their ordinary use of roads and highways; to make the distribution automatically; to cause the operating forces of automotive vehicles to cooperate in effecting such distribution; to employ the exhaust of such vehicles for that purpose; to cause such exhaust to actuate material feeding mechanism; and by the use of such means as above suggested to accomplish the distribution of such material in small quantities by so many vehicles that the aggregate amount distributed will be effective to lay dust and/or soften ice upon roads and highways to an appreciable degree, all as is hereinafter more particularly explained.

In the drawing, Fig. 1, is a side elevation of the rear end of an automobile with typical means for carrying out my improved method attached; Fig. 2, is a rear elevation of the same, the mud guards and the lower portions of the wheels being removed, for clearness; Fig. 3, is a detail, on an enlarged scale, of a vertical section of a modification, taken as on the line 3—3 of Fig. 4; and Fig. 4, is a vertical section of the lower part of such modification, taken as on the line 4—4 of Fig. 3.

In all the figures similar parts are designated by similar reference numerals.

To illustrate an application of my invention I have shown the rear part of a typical automobile, 1, 1 being the wheels, centrally broken away in Fig. 1, 2, the rear axle, 3, 3 springs, 4, 4 the frame, 5 the gasoline tank, and 6 the exhaust pipe.

In a suitable position, where space will permit, as, for instance behind and above the gasoline tank 5 and carried by frame 4, 4, may be mounted a tank, as 7, the sides and bottom of which are preferably sloped toward an outlet 8, from which a pipe 9 leads down toward the exhaust pipe 6. This pipe may be provided with a cock or valve 10 by which it may be opened or closed as occasion requires.

The lower end of this pipe 9 is connected into a sleeve member 11, which is adapted to slip over the end of the exhaust pipe 6, and may be detachably attached thereto as by a set screw 12.

It is preferable to bend or turn the end of the pipe 9 rearwardly as shown in Fig. 1, so that its open end will be in the direction of the escaping exhaust gasses.

A closure 13 is provided for an opening into the tank 7 through which it may be charged.

A suitable charge, for instance a strong solution of sodium chloride, having been introduced into the tank 7, the cock 10 being closed, the engine of the automobile may be started, and the cock opened so as to permit the flow of the solution through the pipe 9 in such volume as may be desired, the solution falling into the sleeve 11 and being blown out by and with the exhaust gasses, slightly above the road surface, and so as to normally fall to that surface in a more or less diffused state, where it will tend to dampen the roadway and to prevent dust from rising therefrom in the well known manner in which calcium chloride and similar dust laying substances act.

In cold weather when ice and/or snow may produce slippery conditions upon a road, the effect of this treatment is to slightly melt or soften the frozen water so as to make it less slippery than it would otherwise be under the wheels of automotive vehicles.

Under certain circumstances it may be preferable to distribute the dust laying material in a granular or more or less solid state, in which case the pipe 9 should be of sufficient size to allow the substance to pass through it under the force of gravity, which will be assisted by the vibration of the vehicle when in motion, the quantity reaching the exhaust being carried out and scattered by the exhaust blast; or more or less positive feeding means may be provided and driven by the mechanism of the car or through the exhaust.

In Figs. 3 and 4, I have illustrated means for such feeding, a worm 15, within the pipe 9, being carried by a shaft 16 journalled in the sleeve 11, and carrying a worm gear 17 driven by a worm 18 on the shaft 19 of a vane 20 mounted in the casing of sleeve 11 so that it will be rotated by the blast of the exhaust, thus causing the feed screw 15 to draw down the material from the tank 5 to fall down through the pipe 9 into the exhaust blast and to be carried out and scattered by it, the relative proportions and rate of movement of the parts of the feeding apparatus being such that the distribution of the material will be at a rate which experience may show to be desirable under the circumstances.

This particular form of feed is to be considered simply as typical; for it is obvious that other forms accomplishing an equivalent result may be employed, whereby material may be fed into the exhaust blast.

The use of my improvements is particularly desirable on unsurfaced or dirt roads, where in dry seasons dust is very annoying.

If a dust layer is distributed from a considerable number of cars using such a road, the aggregate result will very materially diminish the dust nuisance; besides which the trouble and expense of providing for special apparatus and labor for spreading the dust layer would be avoided, and the improvement of the road conditions would be effected by the users of the road in the process of using it.

While I have suggested the use of calcium chloride for the purposes mentioned, I do not wish to confine myself to that material alone, for other materials might be used to obtain similar results; and other equivalent means for scattering the dust layer from ordinary automotive vehicles might be used without departing from the spirit of my invention or the scope of my claims.

Having thus described my invention what I claim and desire to secure by Letters Patent of the United States is:—

1. Means for distributing moisture absorbing material consisting in the combination with an automotive vehicle embodying an internal combustion engine and an exhaust duct, of a material container, a material duct extending from the container to the exhaust duct, positively acting means actuated by the exhaust blast for moving material through the material duct to and into the exhaust duct and into the path of the blast through said exhaust duct.

2. Means for distributing moisture absorbing material consisting in the combination with an automotive vehicle embodying an internal combustion engine and an exhaust duct, of a material container, a material duct extending from the container to the exhaust duct, positively acting, mechanical means embodying a motor element driven by the exhaust blast and a feed worm actuated thereby for moving material through the material duct to and into the exhaust duct and into the path of the blast through said exhaust duct.

WILLIAM ORMISTON ROY.